US011601528B2

(12) United States Patent
Burke

(10) Patent No.: US 11,601,528 B2
(45) Date of Patent: Mar. 7, 2023

(54) SYSTEM AND METHOD FOR REMOTE EXECUTION OF REAL TIME CONTROL (RTC) HARDWARE

(71) Applicant: Virtual Peaker, Inc., Louisville, KY (US)

(72) Inventor: William J. Burke, Louisville, KY (US)

(73) Assignee: Virtual Peaker, Inc., Louisville, KY (US)

( * ) Notice: Subject to any disclaimer, the term of this patent is extended or adjusted under 35 U.S.C. 154(b) by 273 days.

(21) Appl. No.: 16/932,311

(22) Filed: Jul. 17, 2020

(65) Prior Publication Data
US 2021/0021695 A1 Jan. 21, 2021

Related U.S. Application Data

(60) Provisional application No. 62/876,384, filed on Jul. 19, 2019.

(51) Int. Cl.
| | |
|---|---|
| G06F 15/16 | (2006.01) |
| H04L 69/08 | (2022.01) |
| G06F 16/903 | (2019.01) |
| G05B 15/02 | (2006.01) |
| H04L 9/40 | (2022.01) |

(52) U.S. Cl.
CPC ............ *H04L 69/08* (2013.01); *G05B 15/02* (2013.01); *G06F 16/90335* (2019.01); *H04L 63/08* (2013.01)

(58) Field of Classification Search
None
See application file for complete search history.

(56) References Cited

U.S. PATENT DOCUMENTS

| | | | | |
|---|---|---|---|---|
| 6,282,580 | B1* | 8/2001 | Chang | G06F 9/465 719/316 |
| 10,454,856 | B2* | 10/2019 | Tao | H04L 51/04 |
| 2002/0156921 | A1* | 10/2002 | Dutta | H04L 67/04 709/219 |
| 2005/0076112 | A1* | 4/2005 | Ravindran | H04L 41/046 709/224 |
| 2011/0314086 | A1* | 12/2011 | Finkelstein | H04L 65/80 709/203 |
| 2013/0147900 | A1* | 6/2013 | Weiser | H04N 7/15 348/E7.083 |
| 2014/0196048 | A1* | 7/2014 | Mathur | G06F 9/485 718/104 |
| 2016/0323457 | A1* | 11/2016 | Isomäki | H04M 11/007 |
| 2016/0380968 | A1* | 12/2016 | Sarwar | H04W 8/24 709/245 |
| 2019/0333059 | A1* | 10/2019 | Fallah | G06Q 20/308 |
| 2020/0021481 | A1* | 1/2020 | Tsigkogiannis | H04L 67/104 |
| 2020/0118109 | A1* | 4/2020 | Hubert | G06Q 20/027 |
| 2020/0218218 | A1 | 7/2020 | Burke | |
| 2021/0218710 | A1* | 7/2021 | Fallah | H04L 63/0876 |

* cited by examiner

*Primary Examiner* — Brian Whipple
*Assistant Examiner* — Gregory P Tolchinsky
(74) *Attorney, Agent, or Firm* — Dinsmore & Shohl LLP

(57) ABSTRACT

A system for interfacing a third-party system with a client device, the system includes a platform having one or more computing devices communicatively coupled to the third-party system and the client device, the platform is configured to receive, from a third-party system, a request for a client device, translate the request from the third-party system to a client specific protocol, transmit the request in the client specific protocol to the client device, and receive a response from the client device based on the request.

18 Claims, 3 Drawing Sheets

SYSTEM AND METHOD FOR REMOTE EXECUTION OF REAL TIME CONTROL (RTC) HARDWARE

CROSS-REFERENCE TO RELATED APPLICATION

This application claims the benefit of U.S. Provisional Application No. 62/876,384, filed Jul. 19, 2019, the entirety of which is hereby incorporated by reference in its entirety.

TECHNICAL FIELD

The present specification generally relates to systems and methods for interfacing third-party software and/or control algorithms with controllable devices and systems.

BACKGROUND

Real-time control systems operate in an iterative fashion and are known to have onerous memory requirements when operating in the server environment. Further, real-time control systems generally require a tight coupling between hardware and software and tight timing loops. That is, tight timing between receipt of a status or data from a system to be controlled and the delivery of a new or the next control command. Additionally, security is paramount in server based systems, and that means that the software that operates on the server should be well vetted for security. Further, the stability and scalability of the software that operates on servers should be well understood to provide an adequate customer experience.

However, understanding the stability and security of a third-party's software and/or control algorithms requires significant review and testing before implementing on a platform for server based real-time control of a system. Since it is generally too high of a risk to execute third-party software and/or control algorithms in fragile environments (e.g., real-time control servers) without extensive review, there is a need for an alternate solution to interfacing third-party software and/or control algorithms with real-time control systems.

SUMMARY

In one embodiment, a system for interfacing a third-party system with a client device is disclosed, The system includes a platform having one or more computing devices communicatively coupled to the third-party system and the client device, the platform is configured to receive, from a third-party system, a request for a client device, translate the request from the third-party system to a client specific protocol, transmit the request in the client specific protocol to the client device, and receive a response from the client device based on the request.

In some embodiments, methods for interfacing a third-party system with a client device are disclosed. The method may include receiving, at a computing device, from a third-party system, a request for a client device, translating, with the computing device, the request from the third-party system to a client specific protocol, transmitting, from the computing device, the request in the client specific protocol to the client device, and receiving, at the computing device, a response from the client device based on the request.

In some embodiments, a non-transitory computer-readable medium that stores logic that, when executed by a computing device causes the computing device to perform at least the following: receive, from a third-party system, a request for a client device, translate the request from the third-party system to a client specific protocol, transmit the request in the client specific protocol to the client device, and receive a response from the client device based on the request.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
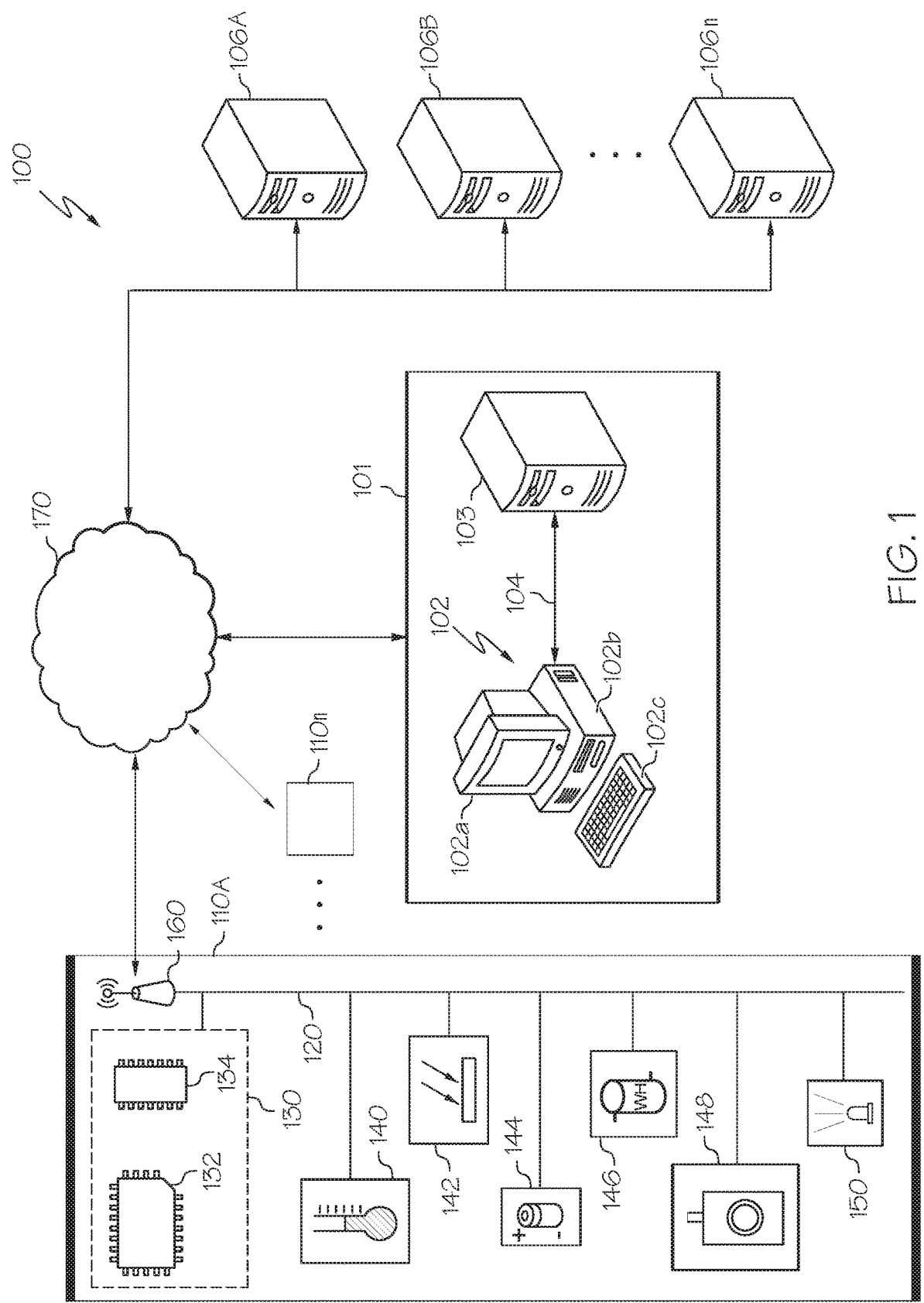
FIG. 1 depicts an illustrative system that interfaces third-party systems with controllable devices and systems, according to one or more embodiments shown and described herein.

Embodiments described herein relate to systems and methods for interfacing third-party software and/or control algorithms with controllable devices and systems. The systems and methods utilize an intermediate platform referred to herein as a "platform" to interface third-party systems with client systems so that the third-party software and/or control algorithms may be utilized without needing to operate on a platform server of a platform or a controller of a controllable device or system. The systems and methods described herein are executed in real-time or near real-time.

In some embodiments, as described in more detail herein, the platform receives a registration request from a third-party system to interface with a client system. The platform may register the third-party system. The registration process may include establishing a post-back URL. The post-back URL provides a means for a request from a third-party device to be processed and propagated through systems and devices that the third-party system does not control and ultimately return a confirmation or response to the request to the third-party system in a timely fashion. Once registered, the third-party system may request data or transmit a command to control one or more controllable devices or systems of the client system. This is generally referred to as a "request" herein. When a request for data is received, the platform may query the corresponding controllable device and/or system that the request is intended. In many situations, the platform may communicate with a variety of brands, models, and/or customized controllable devices and/or systems where a specific protocol or communication language is required to interact with the one or more controllable device or system. The platform translates and communicates the request from the third-party system into the specific protocol or communication language so the third-party system does not need to be adapted to communicate with the numerous protocols and/or communication languages employed by the various devices. That is, the platform may operate as a universal translator and/or universal interface between the third-party systems and the controllable devices or systems of the client system.

The platform and the methods described herein provide improved systems and methods for configuring and enabling third-party systems to work with client based systems and devices. In particular, the platform is configured to provide a universal interface and communication conduit between client systems and third-party systems. In the absence of the platform and methods described herein, third-party systems (e.g., an electrical utility or remote automation service) must be configured to communicate with and be initialized with client specific system protocols and the particular network of client devices enabled in a client system. However, the platform and methods implemented by the platform described herein provides a new option for interfacing third-party systems and client devices, where the third-party system does not need to be particularly configured to interface with the client system or devices. That is, the platform is configured to interface with the client system using client specific protocols and configurations that would otherwise need to be understood and implemented by the third-party system in order to interface with the client system. Furthermore, by utilizing the platform as an intermediate between the client system and the third party system, clients who own and operate client systems can be assured that third-party systems will not introduce malicious or corrupt code or operation within the client system, because the platform is configured to validate requests and confirm security of the communications from third-party systems.

More generally, the platform may be preconfigured to interface with the client system and each of the client devices of the client system. That is, when a client system is setup with a platform, protocols, set point limits, security requirements, timing parameters and the like may be input and setup with the platform. In some embodiments, the platform may be provided a set of commands and related data types that may be queried or sent to the client device in response to a third-party system's request. This may include protocols or prompts that are required to request data or set control commands within the client system. In some embodiments, the client protocols may be obtained and implemented within the platform by receiving and registering the make, model, and firmware version of the client devices of the client system. This may also include IP address routing, MAC addresses for the client devices and the like. Additionally, when a third-party system is registered with the platform, the platform is informed of the protocols (e.g., data formats and methods of communication) that the third-party system uses. For example, a third-party system may utilize key word or object based commands such as "query Voltage (deviceType)" which may result in a query of the current voltage value for a device type such as a battery, solar panel, motor, or the like. The platform may receive such a request from a third-party system and translate it into a client specific protocol or format. For example, the client system may operate using a different protocol such as identifying every client device with a device ID that the platform may store and keep updated in its memory and would otherwise be unknown to the third-party system. In further embodiments, the format in which data is stored and communicated by the third-party system and the client system may differ. The platform may be preconfigured to know which format each system utilizes and this translate or convert between the formats thereby enabling seamless communication between the systems. The advantage to implementing a platform, as disclosed herein, is thus being able to translate the third-party system request into a client specific protocol so that the request may be carried out in real-time or near-real time. Once the platform is setup with a client system, the client system may provide the platform with updates with respect to its configuration or protocols from time-to-time. This is merely one example of how the platform may implement a step of translating the third-party system request to a client specific protocol or converting a client response to a third-party system specific protocol.

Once the request is translated to a client specific protocol, as discussed herein, the platform then queries the controllable device or system that may provide the information the third-party system is seeking. Upon receiving the queried information, the platform may convert and communicate the data set in a format compatible with the third-party system to the third-party system (i.e., a third-party specific protocol or format). In some embodiments, the third-party specific protocol or format may be a particular data structure, communication protocol, or method of communicating that is specific to the third-party system. In some embodiments, the platform may also send a list of commands that the third-party may request execution of for controlling one or more controllable device of system of the client system. The third-party system may execute one or more algorithms utilizing the received data. In response, the third-party system provides the platform with a command and/or set points for controlling the controllable device or system. The platform may validate the requested command and/or set points to assure they are compatible and valid commands and values before translating and communicating the command to the controllable device or system.

Embodiments of the present disclosure are directed to systems and methods for interfacing third-party software and/or control algorithms with client systems through a platform providing a more secure and scalable way to operate third-party software and/or control algorithms. The following will now describe these systems and methods in more detail with reference to the drawings and where like number refer to like structures.

Turning now to FIG. 1, an example of a system 100 that interfaces third-party systems 106A-106n with one or more client systems 110A-110n is depicted. The system 100 includes one or more third-party systems 106A-106n (collectively referred to as a third-party system(s) 106) with a platform 101, one or more client systems 110A-110n (collectively referred to as a client system(s) 110) and a platform 101 communicatively coupled to each other. In some embodiments, the third-party systems 106, the client systems 110, and the platform 101 may be communicatively coupled in a distributed computing framework. In some embodiments, a cloud computing structure may be implemented to connect the third-party systems 106, the client systems 110, and the platform 101. In some embodiments, the components of the system 100 may be communicatively coupled with each other locally or through a network 170 such as a LAN, WAN, the internet, or the like.

In some embodiments, the platform 101 includes one or more computing resources. The platform 101 may include a computing terminal 102 and a platform server 103. The computing terminal 102 may include a display 102a, a processing unit 102b and an input device 102c, each of which may be communicatively coupled to together and/or to the network 170. The computing terminal 102 may be used to communicate with and/or manage the operations of the platform server 103. The computing terminal 102 may also be used to program new routines or protocols in the platform server 103.

The platform server 103 is configured to carry out operations that enable the third-party system 106 to interface, receive data from, and/or control a client system 110. The platform server 103 may implement a web based API to communicate with the third-party system 106. The platform server 103 will be described in more detail herein with respect to FIGS. 2 and 3.

The third-party system 106 may include utility companies, third-party energy suppliers, data analytic processors, a home or business systems management service provider, or the like. For example, third-party energy suppliers may have clients, such as households that purchase energy from a utility company through the third-party energy supplier at a reduced rate. The third-party energy supplier may provide energy at a reduced rate, for example, utilizing energy arbitrage where the third-party energy supplier buys and sells units of energy at optimal times and prices. The third-party energy suppliers and/or utility companies who may be engaged in arbitrage of energy units may enhance their ability to deliver reduced costs of energy to their clients by monitoring and/or controlling a household's energy consumption, generation, and/or storage of energy. Such monitoring and/or control is made possible through control devices and systems that enable appliances 146, lighting devices 150, power storage devices 144, renewable energy generators 142, household systems, IoT (internet of things) devices, or the like to be connected and controlled through a network 170.

By way of example, a residential house may be equipped with a client system 110. The client system 110 may include an electronic control unit 130 (e.g., having a processor 132 and memory component 134), a thermostat 140, a renewable energy generator 142 (e.g., one or more solar panels, wind turbine, geothermal generator, or the like), power storage device 144 (e.g., one or more batteries), appliances 146 (e.g., a water heater, refrigerator, washing machine, dishwasher, or the like), a power management device 148 (e.g., a power meter, transfer switch, circuit breakers, or the like), one or more lighting devices 150, other IoT device, or the like. The components of the client system 110 may be communicatively coupled to each other through a communication bus 120. The communication bus 120 may also be communicatively coupled to network interface hardware 160. In some embodiments, client system 110 may be any sensor or control device such as a relay, solenoid, pump, switch, thermostat, or the like configured with network interface hardware 160 such that the sensor or control device may interface with a remote computing system. Accordingly, in some embodiments, the client system 110 may not include an electronic control unit 130.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverses. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors 132, memories, sensors, input devices, output devices, and communication devices. Accordingly, the communication bus 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 120 communicatively couples the various components of the client system 110. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and the memory component 134. The processor 132 may be any device capable of executing the machine-readable instruction set stored in the memory component 134. Accordingly, the processor 132 may be an electric controller, an integrated circuit, a microchip, a field programmable gate array, a computer, or any other computing device. The processor 132 is communicatively coupled to the other components of the system 100 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 1 includes a single processor 132, other embodiments may include more than one processor 132.

The memory component 134 is coupled to the communication bus 120 and communicatively coupled to the processor 132. The memory component 134 may be a non-transitory computer-readable memory and may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as machine language that may be directly executed by the processor 132, or assembly language, object-oriented programming (OOP), scripting languages, microcode, etc., that may be compiled or assembled into machine readable instructions and stored in the memory component 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory component 134, other embodiments may include more than one memory components 134.

In some embodiments, the electronic control unit 130 may be or include an internet of things ("IoT") hub, which provides wired or wireless connection to the one or more components of the client system 110 to a network 170 such as the internet. For example, a thermostat 140 may be configured to provide environment data and/or be remotely programmable to control the operation of a cooling and/or heating system within an environment such as a house or office building. The renewable energy generator 142 may include equipment such as one or more solar panels, wind turbines, geothermal generators, or the like. The renewable energy generator 142 may be programmed to operate during optimal conditions and provide excess energy to the power grid, to locally connected loads, or even charge a power storage device 144. The power storage device 144 may include one or more batteries or other medium capable of storing electrical energy in electrical, mechanical, chemical, biological or other form that may be converted back to electrical energy.

Still referring to FIG. 1, appliances 146 may also be configured to be a controllable device. Appliances 146 may include a water heater, a refrigerator, a washing machine, a dishwasher, or the like. In some embodiments, appliances 146 may be controlled to operate only during non-peak times or optimized to operate only when they are customarily used. For example, a third-party system 106 may monitor the usages patterns of an appliance 146 to determine when the appliance 146 is generally used (e.g., patterns may be learned through machine-learning techniques). The third-party system 106 may then optimize its operation by selectively changing set points associated with the appliance 146 at specified times during a day or when the cost of electrical energy is low. For example, a water heater may not need to maintain water at an intermediate or high temperature all day long. Instead, the water heater may be configured to heat water to a user desired temperature prior to the user's customary usage of hot water (e.g., customary usage may occur in the mornings or evenings for showers, dishes, and/or laundry). As such, electrical energy may be conserved during the day and night by reducing the set point at which the water is heated since usage is infrequent or not required to be as hot as normal.

In some embodiments, one or more power management devices 148 including a power meter, a transfer switch, circuit breakers, or the like may be monitored and/or selectively controlled. For example, a third-party system 106 may request power meter usage data from a power meter. Based on the power meter usage data and optionally a power generation value from a renewable energy generator 142, a control signal may be provided to the platform 101 to control the flow of electrical energy. That is, for example, in an energy arbitrage scenario if there is excess power being generated by a household's renewable energy generator 142 (i.e., the household is not consuming power or is generating more than it is consuming) and the price of energy is up, then excess energy may be sold back to the power grid or stored in the power storage device 144 by selectively activating a transfer switch to control at least a portion of the flow of electrical energy to and/or from the power grid. In other embodiments, electrical energy from a power storage device 144 may be discharged to power household requirements or fed to the power grid.

In some embodiments, third-party system 106 may include software for monitoring and controlling the operation of the one or more lighting devices 150 to further optimize the usage of electrical energy and need for lights through the platform 101. While the aforementioned description provides examples of controlling devices through a third-party system 106 and a real-time computing device which may operate as a gateway, service provider, universal translator or the like, the present disclosure is directed to carrying out third-party requests and control algorithms in real-time so that the third-party system 106 does not need to run its software on a local server or the electronic control unit 130. By avoiding running third-party software locally, computing instabilities, complex programming to interface with multiple different controllable devices and systems, and security access and data issues may be avoided. For example, third-party system 106 may simply wish to obtain specific information or provide the convenience of controlling particular aspect of a client system 110 (e.g., a particular device of a client's home or business) and therefore, may not be configured to fully interface with the client system 110 or particular device that it is requesting information from or control of. That is, the third-party system 106 may not be configured to acknowledge or implement safe guards such as handle warnings or alerts provided by the client system 110 or implement the necessary levels of security such as encryption needed to communicate with the client system 110, thereby leaving the client system 110 venerable to a security breach or mismanagement.

Figure 2:
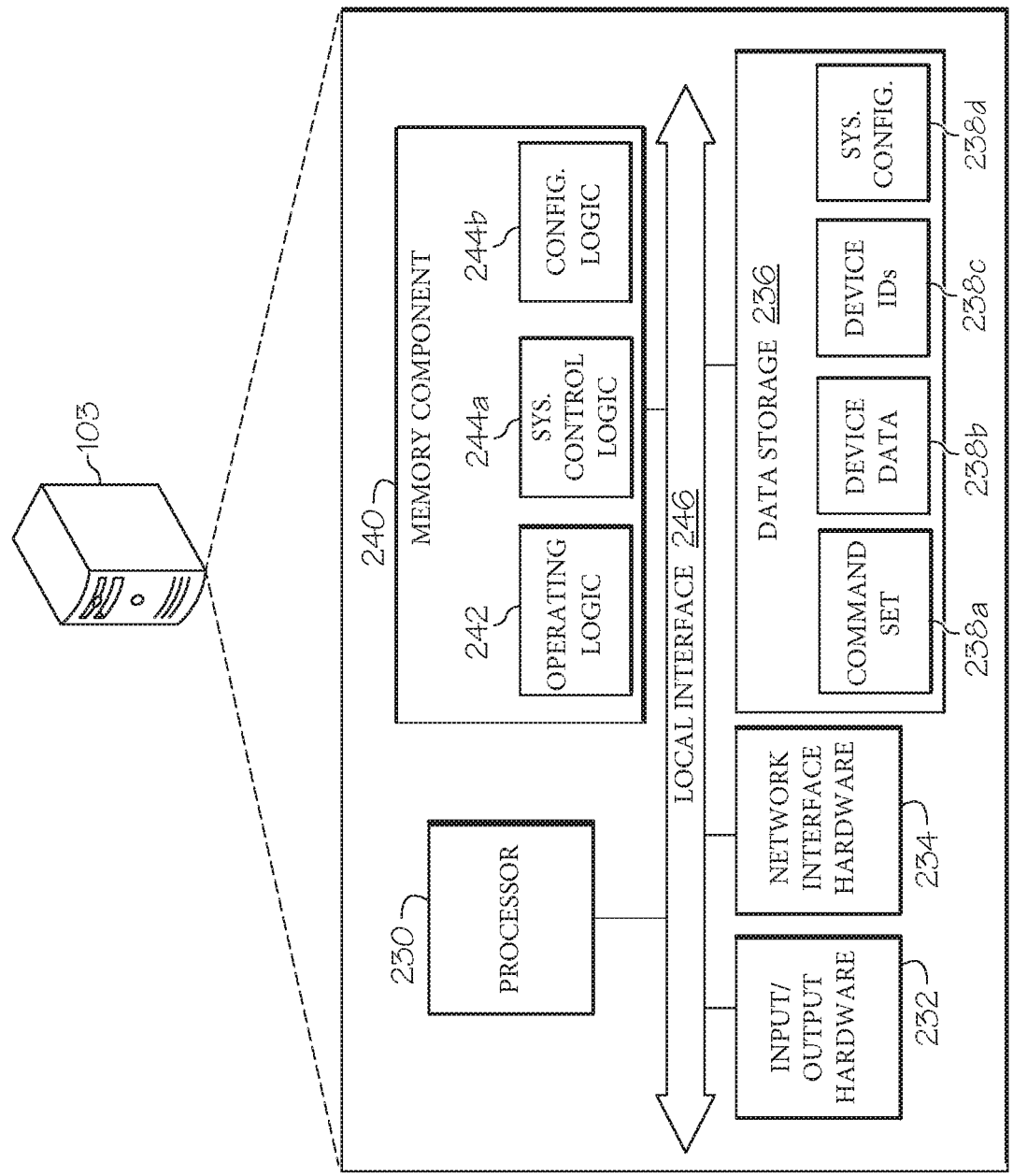
FIG. 2 depicts an illustrative platform server, according to one or more embodiments shown and described herein.

Referring now to FIG. 2, an example platform server 103 is depicted. The platform server 103 may be any device capable of managing requests from a third-party system 106, interfacing with client systems 110 and providing data and control commands therebetween. The platform server 103 may also be configured to provide authentication and security between the third-party system 106 and client systems 110. A local interface 246 is also included in FIG. 2 and may be implemented as a bus or other interface to facilitate communication among the components of the platform server 103.

The platform server 103 may include a processor 230, input/output hardware 232, network interface hardware 234, a data storage component 236, and a memory component 240 each communicatively coupled to each other through the local interface 246. The processor 230 may include any processing component(s) configured to receive and execute programming instructions. The instructions may be in the form of a machine readable instruction set stored in the data storage component 236 and/or the memory component 240. The data storage component 236 may include one or more sets of data that are received or generated by the platform server 103. A command set 238*a*, which includes a set of commands for controlling one or more of the client systems 110 may be stored in the data storage component 236. Device data 238*b* which may include information such as specification details, firmware version, and/or the like about one or more components of the client systems 110 connected to the system 100 may be stored in the data storage component 236. Additionally, device IDs corresponding to the one or more components of the client systems 110 may be stored in the data storage component 236. The device IDs may be utilized for structuring communication between the third-party system 106 and the client system 110 so that the proper device is referenced, queried, and controlled. A system configuration file 238*d* may also be stored in the data storage component 236 and may be updated as new components to the client system 110 are added and/or removed.

The memory component 240 may be machine readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, system control logic 244*a*, and configuration logic 244*b* (each of which may be embodied as a computer program, firmware, or hardware, as an example).

The operating logic 242 may include an operating system and/or other software for managing components of the platform server 103. The system control logic 244*a* includes instructions for performing operations that interface the third-party system 106 with the one or more components of the client systems 110. The configuration logic 244b includes instructions for registering and configuring a third-party system 106. An example of the system control logic 244a and configuration logic 244b will be described in more detail herein with respect to FIG. 3.

The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with networks 170 and/or devices.

Figure 3:
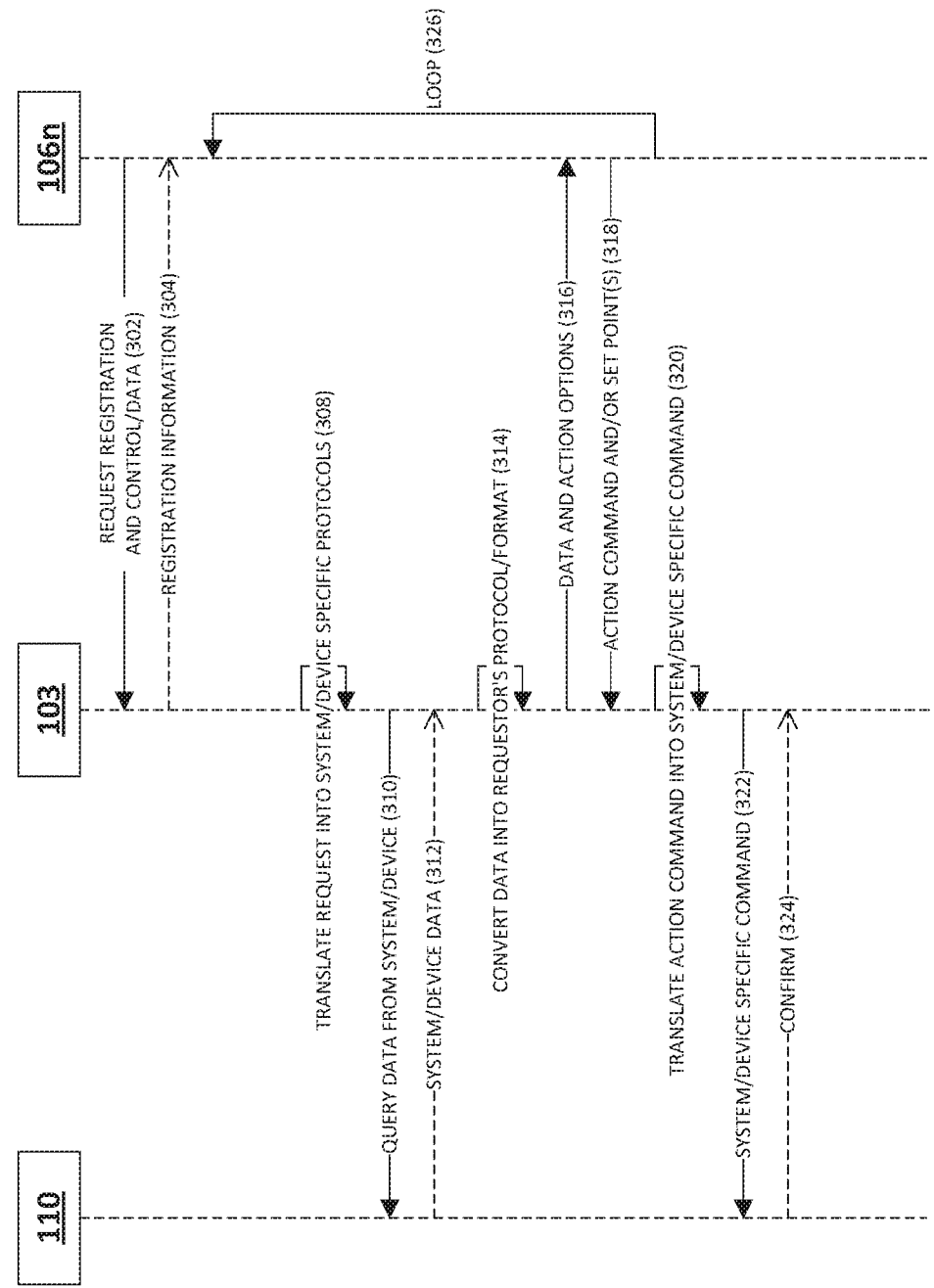
FIG. 3 depicts a diagram illustrating a method of interfacing third-party systems with client systems through a platform server, according to one or more embodiments shown and described herein.

Referring now to FIG. 3, a diagram 300 illustrating a method of interfacing one or more third-party systems 106 with client systems 110 through the platform server 103 is depicted. In some embodiments, the platform server 103 is configured to manage requests for information and updates with new control commands from one or more third-party device or third party system 106. Additionally, the platform server 103 interfaces with one or more client systems 110 for which information requested by the third-party system 106 is queried and control commands and set points are validated and transmitted to the client systems 110, for example, in response to the third-party's analysis and computation of the requested information. The platform server 103 provides a mechanism, for example, through a web based API, that allows third-party software and algorithms to run in real-time with client systems 110 without the need for the third-party software and algorithms to be directly implemented on an electronic control unit (e.g., 130, FIG. 1) of the client system 110 or the platform server 103. As referenced above, this allows for a secure and scalable way to operate third-party software and algorithms.

The benefits to scalability of the third-party software and algorithms that are implemented through the embodiments described herein may be best understood when a third-party system 106 seeks to manage and control a plurality of components or client systems 110 which utilize various protocols, drivers, command sets, and/or different software and firmware versions. That is, many client systems 110 are configured with brand, model, and/or version specific command sets and protocols. In other words, requests for data from a device of a client system 110 and the available set of commands and adjustable set point values for a particular device of a client system 110 may vary between companies and manufacturers. As a result, third-party systems 106 may be required to invest significant resources in assuring that interfaces between their software and the seemingly ever-changing number and versions of client systems 110 remains compatible. However, the scalability problem of third-party systems 106 as well as security concerns of client systems 110 (e.g., those implementing controllable devices and systems) may be resolved through the implementation of embodiments of the platform server 103 and related systems and methods described herein (i.e., the platform 101).

Referring now to FIG. 3 in more detail, one example embodiment of a method for interfacing one or more third-party systems 106 with client systems 110 through the platform server 103 is depicted. A third-party system 106, at step 302, may generate and send a registration request to a platform server 103. The registration request may include initiating a web based API between the platform server 103 and third-party system 106 to facilitate communication between the two. The registration process may further include registering a secure post-back URL (e.g., a webhook), desired input and state data fields, and a specific sample rate. In response, at step 304, the platform server 103, confirms the registration provides any needed security confirmations. With the registration request (e.g., at step 302) or through a separate communication, the third-party system 106 may transmit a request for specific data values and inputs that are desired to be collected from one or more client systems 110. The request may also include one or more control commands intended for controlling an operation or function of the client system 110 and other a client device. In some embodiments, the post-back URL is affiliated with the request such that as the request is processed (e.g., translated into a client-specific protocol) and transmitted by the platform 101 to a client system 110 and/or a client device for a response, the post-back URL is passed along with the request between the systems and devices to provide the system, device, or platform with information that indicates which third-party system should receive the response. The post-back URL may include an identification number corresponding to the registered third-party system. The identification number provides an additional level of security that assures communications and responses to and from third-party systems are genuine. The use of post-back URLs may further enable real-time or near-real-time communication across multiple systems (i.e., the third-party system, the platform, and client systems and devices). For example, since the request and response are affiliated with the post-back URL, the platform 101, for example, does not need to perform additional operations to determine the ultimate destination for a response from a request. The platform 101 simply queries the post-back URL to identify the registered third-party system and subsequently carries out the communication. This may reduce the need to establish dedicated communication channels or routing tables, which may become large and complex as the number of third-party systems and client systems and/or devices that a platform interfaces with increases.

The platform server 103, at step 308, generates a request to query the third-party requested data from the client systems 110 or send the control command to the client system 110 in a format compatible with the protocol of the client systems 110. This may occur at a specified sample rate, for example, every few millisecond, seconds, minutes, or other interval of time. For example, the platform communicates a response from the client to the third-party device in less than a second from receiving the request from the third-party device. At step 310, the platform server 103 transmits a query for data from the client systems 110. At step 312, the platform server 103 receives a response from the queried client systems 110. The platform server 103, at step 314, may then convert the data into a predefined standardized format that is defined by the platform server 103. The predefined standardized format may include a data structure that is normalized to receive and organize data from a variety of client systems 110 (for example, water heater systems manufactured by different companies). For example, the data structure may be different from one that is used by one of the client systems 110, but is consistent between client systems 110 for use by the platform server 103. In other words, the data that is sent in the following step, step 316, contains a format that is consistent regardless of the type and/or manufacturer of the client systems 110. At step 316, the platform server 103 may send an HTTP request containing the data to the third-party system 106 using the post-back URL. The request from the platform server 103 to the third-party system 106 may include a special, single-use, hash key. In response, at step 318, the third-party system 106 may reply to the communication of data with updates (e.g., new set points such as new temperature settings for a thermostat 140) or reply with a response indicating a more detailed response will be forthcoming. In the latter instance of a reply, a short time period (e.g., 5 seconds) would be initiated by the platform server 103 to wait for a response. The delayed response from the third-party system 106 may again use the special, single-use, hash key to identify the response. This method would allow more computation time by the third-party system 106 based on the received input and state data fields received from the platform server 103.

In some embodiments, the platform server 103 may regularly query and maintain state data and set points for one or more of the connected client systems 110. In such an instance, the platform server 103 may not need to query the client systems 110 before sending the data and action options (i.e., step 316). Instead, the platform server 103, with the data and action options request, (i.e., step 316) may return the data and set points requested by the third-party system 106. This may optimize the real-time response of the platform server 103 to a third-party system 106 request.

Once the third-party system 106 receives the requested data and/or set points, the third-party system 106, at step 318, may immediately or with a short delay, provide updated set points and/or a command to be implemented by one or more of the client systems 110. For example, a third-party system 106 may request power usage data, power generation data, and a power storage value from the client systems 110 of a predetermined household. The third-party system 106 may be configured to determine the optimal electrical energy usage, storage, or generation scheme for the predetermined household based on current electrical energy prices. For example, if electrical energy prices are high and the household is determined to be using a lot of power but also generating power, the third-party system 106 may control the components of the client system 110 of the household to reduce dependency on power grid energy which they are being charged for and utilize the electrical energy stored in the power storage device 144 and/or the electrical energy from their renewable energy generator 142. In other situations, the third-party system 106 may determine optimal times to charge a power storage device 144, transfer additional electrical energy to the power grid, or draw electrical energy from the power grid for usage or for storage for a later time when electrical energy prices are high.

In some embodiments, the third-party system 106 may provide set points or new commands for the client systems 110 that optimize the performance or change the operation of the system or device. For example, a water heater may be reconfigured to heat water prior to high usage periods learned from monitoring water usage over time, rather than maintaining the water temperature at a user desired level all the time, which may require additional energy.

When the platform server 103 receives a command and/or new set point values from a third-party system 106, at step 320, the platform server 103 may validate the command and/or set points to assure they are acceptable for implementation and are in a valid format that may be accepted by the client systems 110. The platform server 103, at step 322, transmits the command and/or set points to the client systems 110, and in response, at step 324, may receive a confirmation that the command and/or set points were received and implemented. The platform server (103) continuously repeats the steps of collecting data from the client systems (110), submitting the data and action options to the third party system (106) for processing by its software and/or algorithms, receiving updated commands and/or set points, and relaying those to the client systems (110) through a loop as depicted by step 326.

It should be understood that the embodiments described herein are directed to systems and methods for interfacing third-party software and/or control algorithms with controllable devices and systems. The systems and methods utilize a platform to interface third-party systems with client systems so that the third-party software and/or control algorithms may be utilized without implementing and executing the third-party software and/or control algorithms locally implemented on a platform server of a platform or an electronic control unit of a client system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for interfacing a third-party system with a client device, the system comprising:
   a platform having one or more computing devices communicatively coupled to the third-party system and the client device, wherein the client device includes a controllable device, the one or more computing devices including a processor and a memory, the memory storing logic that, when executed by the processor, cases the platform to perform at least the following:
   (i) receive, from the third-party system, a request for control of operation of the client device;
   (ii) translate the request from the third-party system to a client specific protocol;
   (iii) transmit the request in the client specific protocol to the client device;
   (iv) receive a response from the client device based on the request;
   (v) receive, from the third-party system, a control command to control the client device;
   (vi) validate the command to assure the control command is acceptable for implementation by the client device and are in a valid format that may be accepted by the client device;
   (vii) transmit the command to the client device; and
   (viii) receive a confirmation that the control command was received and implemented,
   wherein the platform validates that the request received from the third-party system includes valid commands, requests, or values for the client device before proceeding with translating or transmitting the request to the client device.

2. The system of claim 1, further comprising receiving a query for data from the client device.

3. The system of claim 1, wherein the platform communicates the response from the client device to the third-party device in less than a second from receiving the request from the third-party device.

4. The system of claim 1, wherein the platform is further configured to:
(v) convert the response to a third-party specific protocol;
(vi) communicate the response from the client device in the third-party specific protocol to the third-party system; and
(vii) in response, receive, from the third-party system, the control command from the third-party system to the response received and processed by the third-party system.

5. The system of claim 4, wherein the platform is further configured to:
(viii) translate the control command from the third-party system to the client specific protocol; and
(ix) communicate the control command in the client specific protocol to the client device.

6. The system of claim 5, wherein the platform is further configured to loop one or more times over steps (i)-(ix) thereby enabling real-time or near real-time control of the client device by the third-party system.

7. The system of claim 1, wherein the platform is further configured to:
receive, from the third-party system, a registration request to interface with the client device; and
initiate a web based API between the platform and the third-party system.

8. The system of claim 1, wherein the platform is further configured to utilize a post-back URL established during registration of the third-party system with the platform to facilitate communication of the request from the third-party system and the response from the client device.

9. A method for interfacing a third-party system with a client device, the method comprising:
receiving, at a computing device, from the third-party system, a request for control of operation of the client device;
translating, with the computing device, the request from the third-party system to a client specific protocol;
transmitting, from the computing device, the request in the client specific protocol to the client device;
receiving, at the computing device, a response from the client device based on the request;
receiving, at the computing device, a control command to control the client device;
validating, at the computing device, the command to assure the control command is acceptable for implementation by the client device and are in a valid format that may be accepted by the client device;
transmitting, at the computing device, the command to the client device;
receive, at the computing device, a confirmation that the control command was received and implemented; and
validate, by the computing device, that the request received from the third-party system includes valid commands, requests, or values for the client device before proceeding with translating or transmitting the request to the client device.

10. The method of claim 9, further comprising receiving a query for data from the client device.

11. The method of claim 9, wherein the response from the client device includes data sought by the third-party system.

12. The method of claim 9, further comprising:
converting, with the computing device, the response to a third-party specific protocol;
communicating, from the computing device, the response from the client device in the third-party specific protocol to the third-party system; and
in response, receiving, with the computing device, from the third-party system, the control command from the third-party system to the response received and processed by the third-party system.

13. The method of claim 12, further comprising:
translating, with the computing device, the control command from the third-party system to the client specific protocol; and
communicating, from the computing device, the control command in the client specific protocol to the client device.

14. The method of claim 12, wherein the control command includes a set of updated set points that adjust an operation of the client device.

15. The method of claim 9, further comprising:
receiving, with the computing device, from the third-party system, a registration request to interface with the client device; and
initiating a web based API between the computing device and the third-party system.

16. The method of claim 9, wherein the platform is further configured to utilize a post-back URL established during registration of the third-party system with the platform to facilitate communication of the request from the third-party system and the response from the client device.

17. A non-transitory computer-readable medium that stores logic that, when executed by a computing device causes the computing device to perform at least the following:
receive, from a third-party system, a request for control of operation of a client device;
translate the request from the third-party system to a client specific protocol;
transmit the request in the client specific protocol to the client device;
receive a response from the client device based on the request;
receive, from the third-party system, a control command to control the client device;
validate the command to assure the control command is acceptable for implementation by the client device and are in a valid format that may be accepted by the client device;
transmit the command to the client device;
receive a confirmation that the control command was received and implemented; and
validate that the request received from the third-party system includes valid commands, requests, or values for the client device before proceeding with translating or transmitting the request to the client device.

18. The non-transitory computer-readable medium of claim 17, wherein the logic further causes the computing device to:
convert the response to a third-party specific protocol;
communicate the response from the client device in the third-party specific protocol to the third-party system;
in response, receive, from the third-party system, the control command from the third-party system to the response received and processed by the third-party system; and translate the control command from the third-party system to the client specific protocol; and communicate the control command in the client specific protocol to the client device.

* * * * *